G. A. WEBSTER.
VALVE.
APPLICATION FILED MAY 11, 1911.
1,004,320. Patented Sept. 26, 1911.
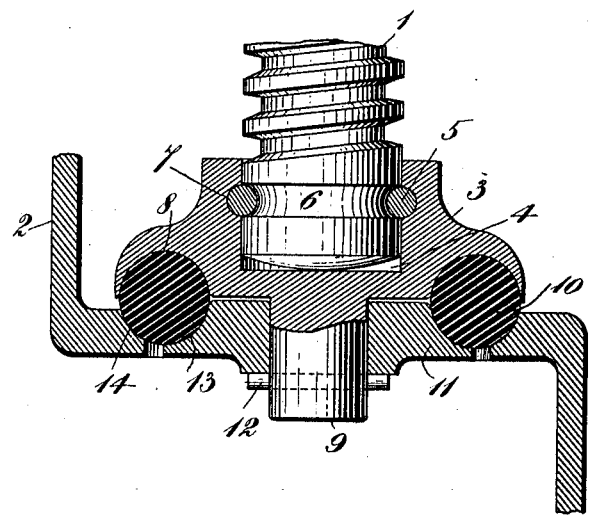

UNITED STATES PATENT OFFICE.

GEORGE A. WEBSTER, OF BOSTON, MASSACHUSETTS, ASSIGNOR TO STAR BRASS MANUFACTURING COMPANY, OF BOSTON, MASSACHUSETTS, A CORPORATION OF MASSACHUSETTS.

VALVE.

1,004,320. Specification of Letters Patent. Patented Sept. 26, 1911.

Application filed May 11, 1911. Serial No. 626,570.

*To all whom it may concern:*

Be it known that I, GEORGE A. WEBSTER, of Boston, in the county of Suffolk and State of Massachusetts, a citizen of the United States, have invented a new and useful Improvements in Valves, of which the following is a full, clear, and exact description, reference being had to the accompanying drawing, forming a part of this specification, in explaining its nature.

My invention relates to an improvement in valves and essentially to the head or seating portion of the valve, being an improvement upon that type of valve head or seating portion employing a reversible and renewable seating member made either of metal, composition or some fibrous material. The advantage of these reversible and renewable members resides in the fact that as the members become worn they may be reversed on the head and a fresh face presented to engage the valve seat as the valve is closed, or the entire member may be taken out and renewed, as occasion may require. The advantage of making these members of fibrous material such as hard vulcanized rubber is that the pressure obtained by closing the valve onto its valve seat so compresses the fibrous member that it will be made to yield and thereby be forced to compensate for any irregularity or imperfection that may reside in the valve seat and obtain a tight fit and positive closure. There is, however, difficulty in the use of a reversible and renewable seating member when made of fibrous material. Unless the member is properly socketed and retained the pressure obtained by closing the valve is apt to destroy or distort it beyond its elastic limits, causing a permanent distortion when the member becomes no longer suitable for effecting its purpose. It has accordingly been found necessary to socket the member in order to maintain its integrity of form. This, however, has resulted in a further difficulty. The pressure from closing the valve has tended to so drive the member into its socket that it could not be removed except in pieces and by the use of a chisel, thereby destroying its reversibility.

It is therefore the object of my invention to provide a construction in which the seating member, and especially a seating member made of fibrous material, may be properly socketed and retained to prevent breakage or distortion when the valve is closed and which is also capable of being easily taken out and reversed even after long usage.

My invention can best be seen and understood by reference to the drawings in which it is shown applied to a valve a portion of which only is shown and this in cross vertical section.

Referring to the drawings:—1 represents a portion of the valve stem, 2 the usual partition which separates the respective chambers of the valve (not shown) and in which partition is formed the valve seat.

3 represents the head of the valve secured to the end of the valve stem 1. For this purpose the head on the upper side thereof is provided with a central opening or socket 4 into which the end of the stem extends. The head is secured to the end of the stem thus extending by means of an annular ring or key 5 which is arranged upon the stem to fit partly within an annular groove 6 formed therein, and partly within an annular groove 7 formed within the adjacent side wall of the socket, this being a common expedient for securing the head of a valve to its stem and enables the head to move longitudinally with the stem though the stem may turn independently of the head as is customary in valves.

Formed on the under side of the head is an annular concave recess or groove 8 presenting an inside face substantially semicircular in cross section throughout. Depending centrally from the under side of the head is a boss 9.

10 is a seating ring preferably made of some fibrous material such as hard vulcanized rubber, though it may be made of metal or composition. This ring has a substantially circular cross sectional area throughout and substantially one annular upper half part of it fits in the annular recess or groove 8 formed in the under side of the head. The seating ring 10 is held in place by means of the holder 11. This holder in the construction shown is illustrated in the form of an annular washer which fits over the boss 9 to engage the seating ring and is held in place by means of a key 12 extending laterally through the boss below the holder or washer 11 and bearing snugly against the under side of the holder or washer for holding it securely in place. The holder 11 bears against or engages the under inside quarter section of the seating ring 10 by an annular concave groove 13 formed in the holder. The cross sectional face of this groove throughout has substantially the same curve as that of the adjacent portion of the ring which it engages, or, in other words, substantially the same curve as that of the recess or groove 8 formed in the head.

14 is the valve seat formed in the diaphragm 2. The disposition and arrangement of the parts is such that the lower quarter sectional outer portion of the seating ring will engage the valve seat when the valve is closed. Accordingly the disposition of the seat 14 is such as to receive said portion of the seating ring. For this purpose and for the purpose also of assisting in the retention of the seating ring, the seat 14 is annularly beveled and concaved to present a bearing face having substantially the same curve as the seating ring against which it bears when the valve is closed, or that of the grooves 8 and 12 formed in the head and holder, respectively, which also assist in the retention of the seating ring.

The operation of the parts is as follows:— When the valve is closed upon the valve seat the pressure effected and incident to such closure does not act to distort or deform the seating ring, but by reason of the circular cross sectional form of the seating ring and the corresponding bearing faces presented by the head, holder and the seat, respectively, the force exerted upon the seating ring will be in the direction of the center of its cross sectional area throughout which may tend to contract the ring, but will maintain its normal form.

When it is desired to reverse or remove the seating ring, which can of course be done only when the valve is open, the key 12 is taken out and the holder 11 removed. The seating ring may then be easily reversed or removed for owing to the substantially semi-circular cross sectional form of the annular recess or groove formed in the head it is impossible for the seating ring to become fixed or wedged in the head.

Having thus fully described my invention, I claim and desire to secure by Letters Patent of the United States:—

In a valve, a valve head having on the under side thereof an annular concaved recess presenting a bearing face substantially semi-circular in cross section throughout, a seating ring having a substantially circular cross sectional area throughout, substantially one half upper part of the ring fitting within said recess formed in the head, a ring holder secured to said head and engaging the lower inside quarter section portion of said seating ring by an annular concave groove formed in said holder, the bearing face of which in cross section is substantially the same as the curve of said ring, and an annular beveled concave seat concaved to present a face having substantially the same curve as the lower outer quarter section portion of said seating ring and with which seat said outer portion of the ring has engagement when the valve head is in a closed position.

GEORGE A. WEBSTER.

Witnesses:
  JOHN E. R. HAYES,
  JAMES J. KENNEALLY.

---

Copies of this patent may be obtained for five cents each, by addressing the "Commissioner of Patents, Washington, D. C."